Nov. 30, 1971    F. W. EMERSON    3,623,175
NEGATOR DRIVEN TOOTHBRUSH
Filed Nov. 5, 1969    2 Sheets-Sheet 2
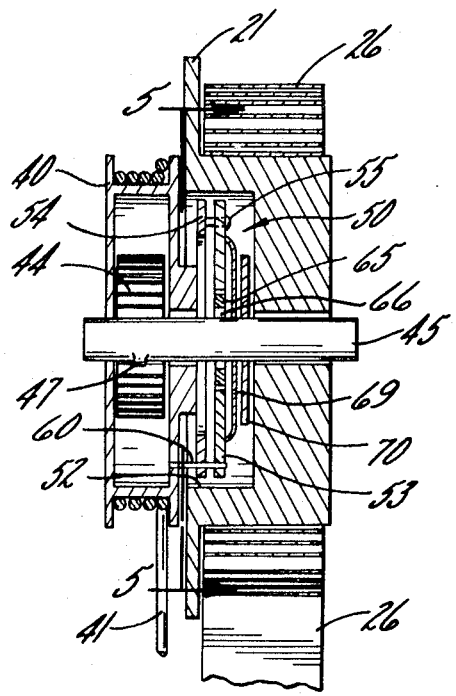
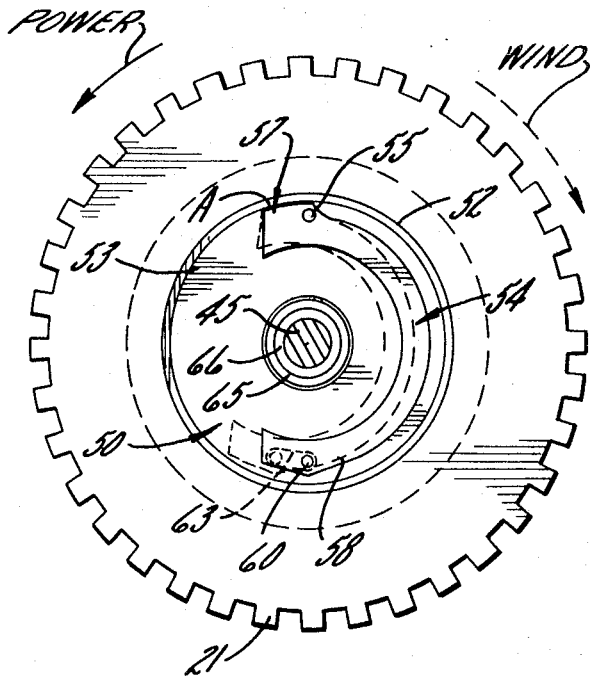
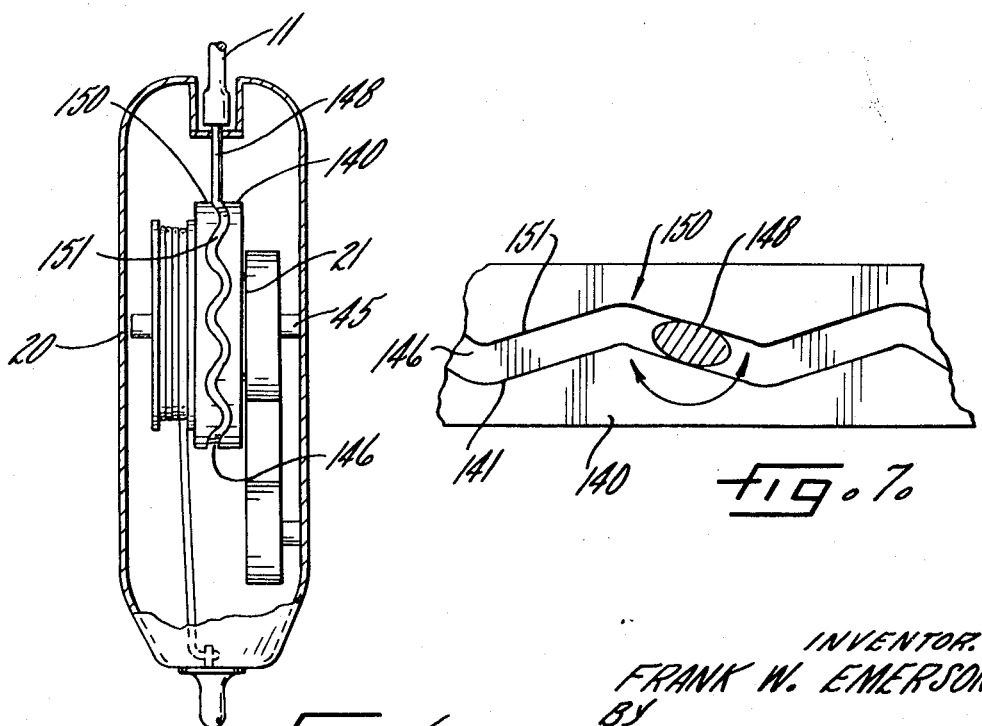
INVENTOR.
FRANK W. EMERSON
BY
Wolfe, Hubbard, Voit & Osann
ATTORNEYS.

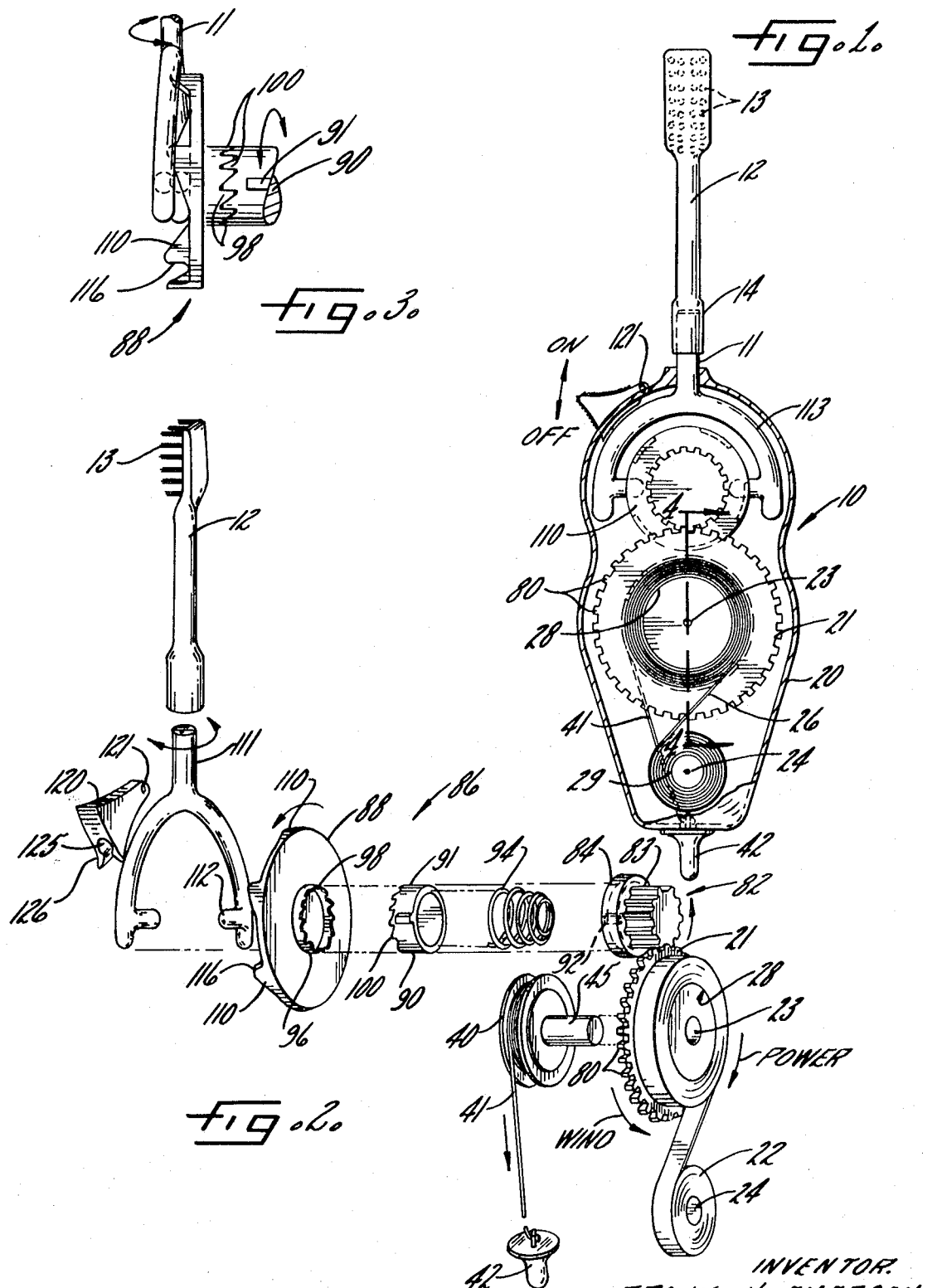

United States Patent Office 3,623,175
Patented Nov. 30, 1971

3,623,175
NEGATOR DRIVEN TOOTHBRUSH
Frank W. Emerson, 113 Roper Drive,
Peterborough, Ontario, Canada
Filed Nov. 5, 1969, Ser. No. 874,226
Int. Cl. A61c 17/00; A46b 13/02
U.S. Cl. 15—22 R                                7 Claims

ABSTRACT OF THE DISCLOSURE

A spring-driven motor assembly for producing oscillatory motion of an output shaft and particularly adapted for use in a power toothbrush assembly. A spring drive producing a substantially constant output torque is wound by a pull-cord winding assembly and released to impart a drive force to an escapement-type motion translator which oscillates an output shaft. Included between the winding assembly and the spring support is a clutch which allows unwinding of the power spring free from any drag effect from the winding assembly.

BACKGROUND OF THE INVENTION

This invention relates generally to spring driven motors and in particular to a power toothbrush utilizing such a motor as a motive force.

Spring-driven motors in general have been used extensively to drive everything from the simplest toy to complex power machinery. Spring-driven power toothbrushes in particular are well known to the art and have become available in several forms. However, the power toothbrushes presently available are wound by a rotational hand movement directly imparting a winding force on a spiral spring. Also, the oscillatory motion of the toothbrush shaft is created through a rather complex and inefficient motion translation mechanism. Because the spiral spring and other types of springs used in these toothbrushes all produce an output torque which is initially very high but which decreases rapidly with unwinding of the spring, many of the previous toothbrushes have required a speed governor to be included with the motion translation mechanism, adding to the complexity thereof.

DESCRIPTION OF THE INVENTION

The present invention overcomes certain disadvantages inherent in the spring-driven motors and power toothbrushes described above and incorporates certain techniques presently known with other techniques heretofore untaught in the art to provide a novel spring-driven motor adapted for power toothbrushes.

Specifically, it is an object of the present invention to provide a spring-driven motor imparting a substantially constant torque to an oscillating output shaft with a minimum of motion translation complexity.

It is another object of the present invention to provide a spring-driven motor incorporating a pull-cord winding mechanism. A related object of the present invention is the provision of a simple and efficient clutch to control the relative motion between the spring assembly and the winding assembly.

Another object of the present invention is the provision of a spring-driven motor having the above features which is particularly adapted for supplying the motive force for a toothbrush so as to provide a toothbrush capable of running at a constant speed and a constant torque.

A still further object of the present invention is the provision of a power-driven toothbrush which is simple, efficient, and inexpensive to manufacture and assemble.

Other objects and advantages of the present invention will become apparent upon reading the attached detailed description and upon reference to the drawings in which:

FIG. 1 is a front elevation view, partially cut away, of a spring-driven toothbrush shown in its assembled form and constructed in accordance with the present invention;

FIG. 2 is an exploded view, in perspective, showing the internal parts of the assembly shown in FIG. 1;

FIG. 3 is a side elevational view of the escapement-type motion translation assembly shown in FIG. 1;

FIG. 4 is a vertical section view of the spring-winding and clutch assembly of the present invention;

FIG. 5 is a side elevational view taken generally along the line 5—5 of FIG. 4 showing the clutch in its two basic positions;

FIGS. 6 and 7 are partial and fragmentary views respectively of alternative embodiments of the present invention illustrating the use of an eccentric cam escapement as a motion translation means.

While the invention has been described in connection with a preferred embodiment, we do not intend to limit the invention to the form set forth but, on the contrary, we intend to cover such alternatives, modifications and equivalents as may be included within the spirit and scope of the invention.

Turning now to the drawings, there is shown in FIG. 1 a spring-driven power toothbrush generally comprised of a motor 10 having an output shaft 11. A brush 12 having a plurality of bristles 13 at one end thereof is rigidly mounted at its other end 14 to the output shaft 11. The motor 10 is enclosed in a housing 20 of a shape and size suitable for comfortable holding by the user.

For the purpose of providing a source of mechanical drive for the output shaft 11, the motor 10 has a drive mechanism including a main output drum or arbor 21 and a takeup drum 22 which are rotatable on parallel axes 23, 24 respectively. The actual spring for the motor consists of a flat metal band 26 selectively wound about each of the drums 21, 22 in opposite directions. The metal band 26 has its opposite ends permanently connected to the inner hubs 28, 29 of the drums 21, 22, respectively, and has a length sufficient to allow it to be wound several times about the main spring arbor 21. Also, the band 26 is made of spring steel and is pre-stressed to be normally biased toward accumulation on the takeup drum 22. The entire output drum-takeup drum-spring assembly is at this time well known in the spring art as a "negator" and is described in more detail in paper No. 51–F–11: from "Transactions of the ASME," "The Theory and Design of Long-Deflection Constant Force Spring Elements." The primary characteristic of this spring arrngement is the constant torque output which is provided as the band 26 is transferred from the output drum 21 to the takeup drum 22 under the force of its own self-bias. In this respect, the spring differs considerably from conventional coil springs, leaf springs, spiral springs and other resilient elements which produce a torque output which varies considerably between the fully wound and fully unwound conditions of the spring. Certain advantages are derived from the use of this type of spring in the present instance, as will be pointed out in subsequent paragraphs.

For the purpose of extending the spring 26 for winding on the output drum, there is provided winding means in the form of a spool 40 which is axially aligned with the output drum 21 (FIGS. 2 and 4). Wound about the periphery of the spool 40 is a pull-cord 41 with a hand knob 42 attached at its outermost end. The inner end of the cord 41 is secured to the periphery of the spool 40. Extension of the cord 41 from the spool 40 is oposed by a spirator spring 44 inside the spool (FIG. 4). The spirator spring 44 is spirally wound about a stationary shaft 45 which is secured to the motor housing 20 and extends through the spool 40 and the output drum 21. A hook 47 formed on the shaft 45 holds the inner end of the spring 44 while the outer end of the spring is secured to the inside surface of the spool 40. The spirator spring 44 biases the winding spool 40 toward accumulation of the pull-cord 41 on its periphery and retraction of the handknob 42 toward the position shown in FIG. 1.

An important aspect of the present invention is the provision of a clutch mechanism for coupling the winding spool to the output drum during a winding movement, for automatically disconnecting the winding spool from the output drum during return movement of the winding spool to its relaxed position, and for allowing the output drum to deliver its output torque unimpeded by any frictional drag from its winding means. The uncoupling of the winding means from the output drum during the return movement of the winding means allows the winding effort to be imparted through a number of successive extensions of the pull-cord, providing a substantial mechanical advantage and allowing a pull-cord to be used which is much shorter than the power spring 26.

As illustrated in FIGS. 4 and 5 of the drawings, the clutch mechanism 50 is disposed for operation between a driving member, which in the present instance is the winding spool 40, and a cylindrical driven member, the output drum 21. The drum 21 has a cylindrical inner surface 52 defining a cavity in which the clutch mechanism 50 resides. The clutch includes a metal disc 53 disposed for rotation about the stationary shaft 45 and a pawl 54 pivotally connected to the disc 53 by a rivet 55 at a point away from the disc axis. In the present instance, the pawl 54 forms an arcuate lever substantially bounding a semicircular portion of a circle. The pawl 54 may take a variety of different shapes; however, the greatest mechanical advantage is obtained by establishing the pivot point (rivet 55) at a point near the periphery of the disc 53 and constructing the pawl 54 to have a short lever arm 57 and a substantially longer lever arm 58 extending to an area of the disc diametrically opposite the pivot point. A drive pin 60 is formed at the working end of the pawl arm 58 and extends perpendicularly therefrom for engagement by the winding spool 40. The pin 60 also extends in the opposite direction from the pawl 54 to intersect a slot 63 formed in the disc 53, which slot defines the path of movement of the pin 60 relative to the disc 63. To provide resiliency during operation of the clutch, there is provided a rubber washer 65 which is concentric with and internal to the metal disc 53. Inside the rubber washer 65 is a metal washer 66 disposed adjacent the shaft 45.

In accordance with another important aspect of the present invention, the clutch mechanism 50 includes memory means for holding the clutch in its most recent operational mode; that is, means are provided for allowing the clutch to maintain either its engaged position or its disengaged position, depending upon whether the last movement of the winding spool 40 was a winding movement or a return movement respectively. The memory means comprises a spring washer 69 inserted under tension between the disc 53 and a circular ring 70 which is formed unitary with the stationary shaft 45.

The clutch and its memory means operates as follows: Extension of the pull-cord 41 in a winding effort causes the spirator spring 44 inside the spool 40 to tighten on the shaft 45. As the winding spool 40 revolves in the winding direction (clockwise according to FIG. 5), so also does the driving pin 60 coupled thereto. The initial movement of the pin 60 causes the pawl 54 to rotate about the rivet 55 to assume the position relative to the disc 53 shown in FIG. 5 by the dotted lines. This pivoting causes lever action of the pawl 54, and the lever arm 57 thereof makes contact with the inner surface 52 of the output drum 21 at point A. The frictional contact between these two surfaces is enhanced by the resiliency provided by the slight compression of the rubber washer 66 internal to the disc 53. The output drum 21, while locked to the winding spool 40 by the clutch mechanism 50, rotates to accumulate the negator spring 26 about its outer surface. Typically, it will take several pulls of the pull-cord 41 to fully wind the negator spring 26 on the output drum. When the pull-cord 41 is fully extended from the winding spool 40 and released, the spirator spring 44 unwinds, causing counterclockwise rotation of the winding spool 40 and retraction of the cord into the motor housing. At the initiation of the counter-clockwise rotation, or return movement, the spring washer 69 holds the disc 53 stationary about the shaft 45 while the winding spool 40, via the drive pin 60, rotates the pawl 54 back to its disengaged position (represented by the solid lines of FIG. 5). As the pin 60 reaches the right-hand extremity of the slot 63, the pawl 54 assumes a fixed position relative to the disc and rotates therewith in the counter-clockwise direction driven by the winding spool 40, completely independent of the output drum 21. Stated another way, the clutch mechanism is effective to engage the output drum during a rotation of the winding spool in one direction, while being effective to disengage the output drum during rotation of the winding spool in the opposite direction, irrespective of the relative movement of the output drum caused by other forces during the rotation of the winding spool in said opposite direction.

In accordance with a further feature of the present invention, means are provided for translating the rotational motion of the spring-loaded output drum into oscillatory displacement of the output shaft. To this end, an escapement-type motion translation mechanism is provided which includes a camming wheel responsive to the rotation of the output drum and cam following means coupled to the inner portion of the output shaft and adapted for alternating engagement by the camming wheel. Because of its escapement-like qualities, this arrangement acts not only as a motion translator but also as a speed governor in much the same way that an escapement governs the speed of a mechanical clock. Referring to FIGS. 1–3, it is seen that the spring output drum 21 shown therein is rimmed with gear teeth 80 which cooperate with a pinion gear 82 which rotates on an axis fixed parallel to the axis of the output drum 21. The pinion gear 82 has a toothed section 83 and a hollow non-toothed section 84. A simple one-way drive clutch assembly 86 selectively couples the pinion gear 82 to a scape wheel or camming wheel 88. The clutch assembly 86 includes an axially movable drive member 90 having an extension 91 adapted for engagement by a notch 92 of the non-toothed section 84 of the pinion gear 82. A spring 94 is inserted in the drive member 90 and extends therefrom to cooperate with an inside surface of the pinion gear 82. Rigidly affixed to and extending from the scape wheel 88 is a shaft member 96 of cylindrical shape. The outer end of this shaft member 96 is rimmed with a series of locking teeth 98 which are adapted for cooperation with a similar set of teeth 100 formed on the movable member 90. In operation, these opposing teeth 98, 100 lock together while the pinion gear 82 drives the scape wheel 88 in the forward direction. When the pinion gear 82 rotates in the reverse direction, however, the teeth 98, 100 act as camming surfaces to each other and allow the movable member 90 to rotate in the reverse direction while the camming wheel 88 remains stationary. The camming action of the teeth 98, 100 is facilitated by the movement of the movable member 90 for a short distance further into the hollow non-toothed section 84 of the pinion gear against the force of the spring 94. Thus, the camming wheel 88 rotates in unison with the pinion gear 82 only while the output drum 21 unwinds. During the winding effort, at which time the output drum 21 and the pinion gear 82 reverse their direction, the clutch 86 disengages the camming wheel 88.

In accordance with the teaching of the present invention, the camming wheel 88 includes a plurality of cam means 110 equally spaced around the periphery thereof to form a crown-shaped assembly. Adapted for cooperation with the camming surfaces 90 are a pair of pallet pins 111, 112 projecting inwardly from a verge 113. The verge 113 is a semi-circular extension from the output shaft 11. The pallet pins 111, 112 cooperate with the verge 113 to function as a cam following means for alternating engagement by the camming wheel 88, causing an oscillatory motion to be imparted to the output shaft 11 and to the toothbrush 12 connected thereto when the camming wheel 88 rotates in the forward direction. The camming wheel 88 is prohibited from rotation in the reverse direction by shoulders 116 of the camming surfaces 110 so that the toothbrush 12 is held in a stationary position during the motor winding effort.

Optional to the toothbrush unit is the on-off switch 120 shown in FIGS. 1 and 2. The switch is pivotally mounted to the motor housing 20 with a pin 121 and extends through a slot therein to engage the verge 113 in a groove 125 formed in the switch. A flange 126 holds the switch 121 within the housing 20 while a small leaf spring (not shown) biases the switch away from the verge 113 toward its ON position. FIG. 1 shows the ON position of the switch 120, in which position the verge 113 is free to oscillate. A downward force on the switch results in engagement of the switch with the verge 113, holding the unit in its OFF condition and preventing unwinding of the spring 26.

An alternative embodiment of the present invention is shown in FIGS. 6 and 7. While these figures are only partially illustrative, they show alternative techniques for effecting motion translation between the output drum 21 and the output shaft 11. The spring winding mechanism and the negator spring power assembly are identical to that described for the preferred embodiment described above. In the embodiment of FIG. 6, however, the output drum 21 is formed in two parts, 140, 150. These parts are circular in shape and rigidly connected by means not shown for rotational movement about the stationary shaft 45. Each of the parts 140, 150 of the output drum 21 has a sinusoidally shaped ridge 141, 151 formed about its periphery. The parts 140, 150 are in opposing alignment and define a sinusoidally shaped path 146. Cooperating with this sinusoidally shaped path is cam following means 148 secured to the inner end of the output shaft 11. The portion of the cam follower 148 extending into the sinusoidally shaped path 146 is eccentric or ellipsoidal in shape to prevent rotation of the follower in the path 146. For the embodiments shown in FIGS. 6 and 7, the cam follower 148 will preferably be formed of a semi-resilient material to allow the shaft 11 to be oscillated without causing lateral displacement thereof in any direction. Therefore, it will be necessary that the shaft 11 be firmly secured in the motor housing 10 so that only rotational or oscillatory motion of the toothbrush will result. The major advantage of the embodiments shown in FIGS. 6 and 7 is the simplicity of construction and the minimal number of parts required for the motion translation. No gears are necessary in the motor movement. The camming path 146 may assume other shapes also. For instance, the saw tooth shaped path illustrated in FIG. 7 will also produce desirable results.

While the spring-driven motor described herein has been described particularly in connection with a power toothbrush, it is by no means limited to this application. Other applications include the driving of a movie camera, in which case the oscillatory motion of the output shaft 11 could control the shutter speed while the rotational motion of the output drum 21 drives the film.

From the above discussion, it will be apparent that there has been brought to the art a new and ingenious spring-driven motor which is adaptable for a multiude of aplications requiring an oscillatory output at a constant torque and speed. The motor described herein is mechanically efficient, structurally simple and inherently inexpensive. The clutch mechanism used in this motor between the winding element and the negator spring is particularly attractive for a variety of rotational drive applications due to its memory capability and compact construction. As a motive force for a portable consumer product such as a toothbrush, the motor provides the advantage of being small enough to be packaged in a hand-held unit and further provides the convenience and desirability of a pull-cord winding mechanism.

I claim as my invention:

1. A spring driven motor comprising, a drive mechanism including an output drum and a take-up drum rotatable on parallel axes and a flat spring connected between said drums and adapted for selective accumulation on said drums, said spring being pre-stressed so as to be self-biased toward accumulation on said take-up drum such that a substantially constant torque is applied to said output drum while said spring is wound thereon and extended from said take-up drum;

manually operated winding means for extending said spring for winding on said output drum;

a clutch mechanism adapted for coupling said winding means to said output drum during a winding movement of said winding means and for automatically disconnecting said winding means upon cessation of said winding movement to allow the output drum to be driven unimpeded by said winding means;

motion translation means including a camming wheel responsive to the rotation of said output drum; and an output shaft having cam following means at one end thereof adapted for alternating engagement by said camming wheel so that oscillatory motion of said shaft is effected by rotation of said wheel.

2. A spring driven motor according to claim 1 wherein said camming wheel includes a plurality of cam means equally spaced around the periphery of said wheel and extending perpendicularly therefrom and wherein said cam following means comprises a verge having a pair of pallet pins spaced for engagement by diametrically opposite cam means on said camming wheel in alternating sequence to produce oscillations of said output shaft in response to rotation of said camming wheel.

3. A spring driven motor according to claim 2 wherein said output shaft is the handle of a toothbrush and said oscillatory motion of said shaft produces a brushing motion of the toothbrush.

4. A spring driven motor comprising, a drive mechanism including an output drum and a take-up drum rotatable on parallel axes and a flat spring connected between said drums and adapted for selective accumulation on said drums, said spring being pre-stressed so as to be self-biased toward accumulation on said take-up drum such that a substantially constant torque is applied to said output drum while said spring is wound thereon and extended from said take-up drum;

manually operated winding means for so extending said spring;

a clutch mechanism including a circular disc axially aligned with and disposed inside said output drum, a pawl pivotally mounted to said disc and having a first arm adapted for selective engagement with said output drum and a second arm continuously engaged by said winding means, and rotation responsive means for effecting engagement of said output drum by said first arm during the winding movement of said winding means in one direction and for disengaging the same when said winding movement has ceased, thereby allowing free movement of said output drum in the other direction;

motion translation means including a camming wheel responsive to the rotation of said output drum; and an output shaft having cam following means at one end thereof adapted for alternating engagement by said camming wheel, whereby oscillatory motion of said shaft is effected.

5. A spring driven motor according to claim 4 wherein said rotation responsive means includes a slot in said disc and a pin fixed to said second pawl arm, said pin having one end disposed within said slot and another end coupled to said winding means such that operation of said winding means effect movement of said pawl about its pivot point and brings said first arm into engagement with the inside surface of said output drum.

6. A spring driven motor comprising
 a drive mechanism including an output drum and a take-up drum rotatable on parallel axes and a flat spring connected between said drums and adapted for selective accumulation on said drums, said spring being pre-stressed so as to be self-biased toward accumulation on said take-up drum such that a substantially constant torque is applied to said output drum when said spring is wound thereon and extended from said take-up drum;
 manually operated winding means for so extending said spring,
 a clutch mechanism coupling said winding means to said output drum during a winding effort;
 an output drive shaft; and
 motion translation means driven by said output drum and adapted to produce oscillatory motion of said drive shaft while governing the drive speed of said output drum.

7. A spring driven motor according to claim 6 wherein said output shaft is the handle of a toothbrush and said oscillatory motion of said shaft produces a brushing motion of the toothbrush.

References Cited

UNITED STATES PATENTS

| | | | |
|---|---|---|---|
| 2,259,964 | 10/1941 | Sussman | 15—23 |
| 2,835,344 | 5/1958 | Allen | 185—37 |
| 3,151,704 | 10/1964 | Clarke | 185—37 |
| 3,241,169 | 3/1966 | Windward | 15—22 |

EDWARD L. ROBERTS, Primary Examiner

U.S. Cl. X.R.

74—54; 185—38